(12) United States Patent  
Borra et al.

(10) Patent No.: US 12,089,310 B2  
(45) Date of Patent: Sep. 10, 2024

(54) CONTROLLER FOR CONTROLLING A PLURALITY OF LIGHTING UNITS IN A SPACE AND A METHOD THEREOF

(71) Applicant: SIGNIFY HOLDING B.V., Eindhoven (NL)

(72) Inventors: Tobias Borra, Rijswijk (NL); Dzmitry Viktorovich Aliakseyeu, Eindhoven (NL); Bartel Marinus Van De Sluis, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 106 days.

(21) Appl. No.: 17/792,429

(22) PCT Filed: Feb. 1, 2021

(86) PCT No.: PCT/EP2021/052234  
§ 371 (c)(1),  
(2) Date: Jul. 13, 2022

(87) PCT Pub. No.: WO2021/156165  
PCT Pub. Date: Aug. 12, 2021

(65) Prior Publication Data  
US 2023/0083233 A1 Mar. 16, 2023

(30) Foreign Application Priority Data  
Feb. 6, 2020 (EP) .................................... 20155816

(51) Int. Cl.  
*H05B 47/115* (2020.01)  
*H05B 47/16* (2020.01)

(52) U.S. Cl.  
CPC ........... *H05B 47/115* (2020.01); *H05B 47/16* (2020.01)

(58) Field of Classification Search  
CPC ............ H05B 47/115–13; H05B 47/16; H05B 47/155  
See application file for complete search history.

(56) References Cited

U.S. PATENT DOCUMENTS

2015/0289347 A1  10/2015  Baaijens et al.  
2016/0286630 A1   9/2016  Witzgall  
(Continued)

FOREIGN PATENT DOCUMENTS

WO       2016145059 A1    9/2016  
WO       2019105885 A1    6/2019  
WO    WO-2020094536 A1 *  5/2020 ............. G10L 15/22

*Primary Examiner* — Renan Luque

(57) ABSTRACT

A method (400) of controlling a plurality of lighting units (112, 114) in a space is disclosed. The method (400) comprises: receiving (402) an input indicative of an activation of a plurality of light settings for the plurality of lighting units (112, 114), obtaining (404) location information indicative of locations of the plurality of lighting units (112, 114) relative to a location and/or an orientation of a user in the space (130), obtaining (406) a circadian rhythm value for each light setting, wherein the circadian rhythm value is indicative of an impact of a respective light spectrum of a respective light setting on the circadian rhythm of a person, mapping (408) the plurality of light settings onto the plurality of lighting units (112, 114), wherein each light setting is mapped onto a lighting unit based on the light setting's respective circadian rhythm value and based on the lighting unit's respective location relative to the location and/or orientation of the user, and controlling (410) the plurality of lighting units (112, 114) according to the mapped light settings.

13 Claims, 4 Drawing Sheets

(56) References Cited

U.S. PATENT DOCUMENTS

| | | |
|---|---|---|
| 2017/0232225 A1 | 8/2017 | Pedersen |
| 2018/0318601 A1 | 11/2018 | Ciccarelli et al. |
| 2019/0350066 A1 | 11/2019 | Herf et al. |

* cited by examiner

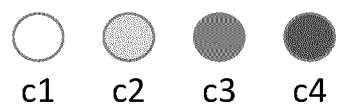
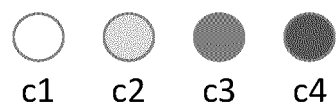
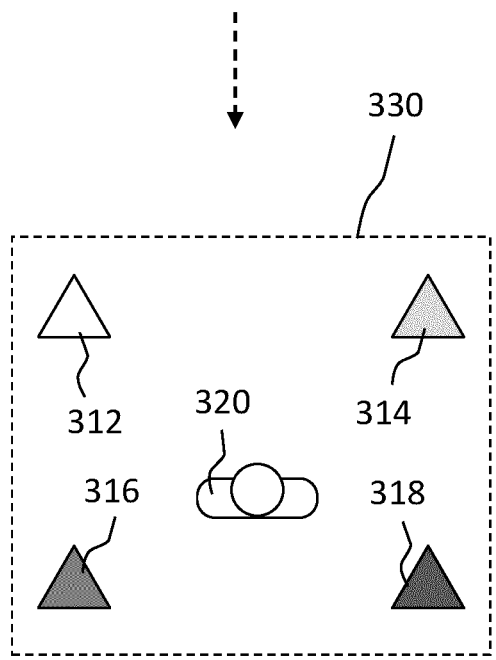
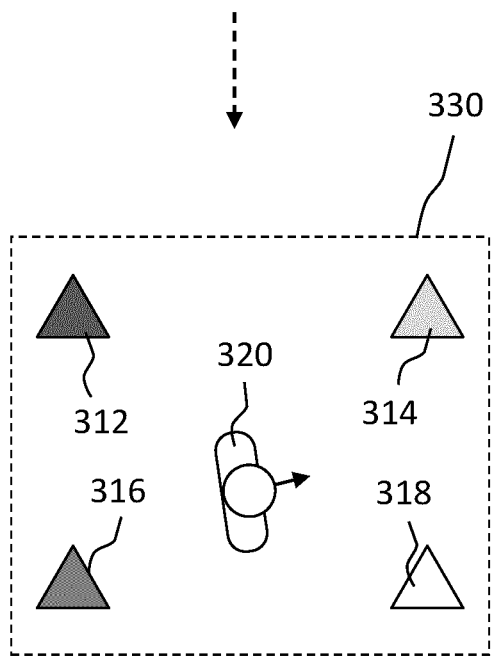
Fig. 3a　　　　　　　　　　Fig. 3b

CONTROLLER FOR CONTROLLING A PLURALITY OF LIGHTING UNITS IN A SPACE AND A METHOD THEREOF

CROSS-REFERENCE TO PRIOR APPLICATIONS

This application is the U.S. National Phase application under 35 U.S.C. § 371 of International Application No. PCT/EP2021/052234, filed on Feb. 1, 2021, which claims the benefit of European Patent Application No. 20155816.0, filed on Feb. 6, 2020. These applications are hereby incorporated by reference herein.

FIELD OF THE INVENTION

The invention relates to a method of controlling a plurality of lighting units in a space, and to a computer program product for executing the method. The invention further relates to a controller for controlling a plurality of lighting units in a space.

BACKGROUND

Home environments typically contain multiple controllable lighting units for creation of atmosphere, accent or task lighting. These controllable lighting units may be controlled via a user interface of a control device, such as a smartphone, via a wireless network. A user may select a light scene via the user interface of the control device, whereupon the lighting units are controlled according to light settings defined by the light scene. Alternatively, the light scene may be activated automatically (e.g. based on a scheduled routine, based on a sensor that has been triggered, etc.) or the lighting units may be controlled according to light settings that are based on media content (e.g. an image, video, music, etc.).

The light settings are mapped onto the lighting units. This mapping may be done by a user, for example via a user interface that enables the user to select light settings for certain lighting units and store the selected settings as the light scene. Alternatively, the mapping may be performed automatically and may, for example, be random or be based on the light rendering properties or types of the lighting units.

US 20180318601 A1 discloses a circadian effect light fixture that includes a controller to receive a modifying factor based on a circadian impact profile. The modifying factor includes an indication of an intensity value, a correlated color temperature value, and a color value over a range of time. The circadian model may be updated based on data collected from sensors and sensor types, including fixed-location sensors and/or mobile sensors.

SUMMARY OF THE INVENTION

The inventors have realized that certain mappings of light settings onto lighting units may have a negative impact on the circadian rhythm of a person. For instance, a user may have created a light scene in his or her living room (or the light scene may have been generated automatically), and the light scene may have been created such that lighting units in front of the user's couch emit cool/bluish white light and lighting units behind the user's couch emit warm white light. If the user would activate the created light scene in the evening and take a seat on the couch, the cool/bluish white light would be visible in front of the user, which light would suppress the melatonin production of the user, resulting in that the circadian rhythm of the user would be disturbed/negatively affected. It is therefore an object of the present invention to provide a method and a controller for mapping light settings to lamps to expose a user to light that improves the user's comfort.

According to a first aspect of the present invention, the object is achieved by a method of controlling a plurality of lighting units in a space, the method comprising:

receiving an input indicative of an activation of a light scene comprising a plurality of light settings for the plurality of lighting units, obtaining location information indicative of locations of the plurality of lighting units relative to a location and/or an orientation of a user in the space, obtaining a circadian rhythm value for each light setting, wherein the circadian rhythm value is indicative of an impact of a respective light spectrum of a respective light setting on the circadian rhythm of a person, mapping the plurality of light settings onto the plurality of lighting units, wherein each light setting is mapped onto a lighting unit based on the light setting's respective circadian rhythm value and based on the lighting unit's respective location relative to the location and/or orientation of the user, and controlling the plurality of lighting units according to the mapped light settings.

The mapping of the light settings onto the plurality of lighting units is based the locations of the lighting units relative to the user, and the circadian rhythm values of the light settings of the plurality of light settings. The circadian rhythm value is indicative of an impact of a respective light spectrum of a respective light setting on the circadian rhythm of a person. The circadian rhythm value may for example be a numeric value, or a binary value indicating whether the user's circadian rhythm is negatively or positively affected. The circadian rhythm values may, for example, be predefined and associated with the respective light settings and obtained from a memory. Alternatively, the circadian rhythm values may for example be determined by analyzing light properties of the plurality of light settings. These light properties may relate to the color, intensity, saturation, spectrum, beam size, beam shape, etc.

If, for example, a user would select a light scene comprising the plurality of light settings (e.g. three light settings for three lighting units), the light settings would be mapped onto the lighting units based on the locations of the lamps relative to the user, and based on the impact the respective light spectra of the respective light settings on the circadian rhythm of the user. Advantageously, that user's circadian rhythm could be affected positively, resulting in an improved user comfort.

The mapping may be further based on a current time of day. The current time of day may be obtained from an (internal or external) clock. Consequently, the light settings may be mapped onto the lighting units such that they are suitable for the current time of day, thereby improving the user's comfort.

Additionally or alternatively, the mapping may be further based on a circadian rhythm of the user. Information about the circadian rhythm of the user may be obtained from, for example, a memory, a user profile, etc. Additionally or alternatively, the information about the circadian rhythm may be a desired impact of the light on the circadian rhythm of the user, which may be defined by a user. Consequently, the light settings may be mapped onto the lighting units such that they are suitable for the circadian rhythm of the specific user in the space, thereby improving the user's comfort.

The mapping may be further based on the locations of the plurality of lighting units and/or (the locations of) their light effects relative to a field of view of the user. This further improves the mapping. The mapping may, for example, be performed such that one or more light settings of which the light spectrum positively impacts the circadian rhythm of the user are mapped onto one or more lighting units of which the light emission is in a field of view of the user. Additionally, one or more light settings of which the light spectrum negatively impacts the circadian rhythm of the user may be mapped onto one or more lighting units of which the light emission is outside the field of view of the user (or less prominent in the field of view of the user).

The mapping may be further based on the locations of the plurality of lighting units and/or (the locations of) their light effects in the field of view of the user. Recent evidence suggests that the distribution of the ipRGCs (intrinsically photosensitive retinal ganglion cells—the cells containing the melanopsin) on the human retina is asymmetric, meaning that lights from the ceiling may have a larger impact on the circadian profile than lights on the floor. Hence, is beneficial to determine the mapping based on the locations of the lighting units and/or their light effects in the field of view of the user, because it improves control of the circadian rhythm of the user.

The mapping may be further based on respective distances between the user and the plurality of lighting units and/or their light effects. This further improves the mapping. The mapping may, for example, be performed such that one or more light settings of which the light spectrum positively impacts the circadian rhythm of the user are mapped onto one or more first lighting units of which the light effect is in closer proximity to the user compared to one or more second lighting units. The light emission of the lighting units in closer proximity of the user may have a larger influence on the circadian rhythm of the user. Taking the distance between the user and the lighting units (and/or their light effects) into account is therefore beneficial, because it further improves the user's comfort.

The location and/or the orientation of the user may be predefined. The predefined location and/or the orientation may, for example, have been defined by a user. The user may have provided information about a predefined/frequently used location (and/or orientation) of a user on a map of the space. In another example, the predefined/frequently used location may be derived from the map of the space (e.g. form a building information model, a user-created map, etc.).

The location and/or the orientation of the user may be obtained by detecting a current location and/or orientation of the user. The system may also monitor the location and/or orientation of the user over time, and determine a typical or frequent location and/or orientation of the user based on this. The location and/or the orientation may, for example, be detected by an (indoor) positioning system, based on signal characteristics of signals transmitted between one or more of the lighting units and a user device carried by the user, based on camera images from a camera located in the space, etc.

The method may further comprise: repeatedly detecting the current location and/or orientation of the user, and remapping the plurality of light settings onto the plurality of lighting units if a difference between a new location and/or orientation of the user and a previous location and/or orientation of the user exceeds a threshold. Hence, the mapping only changes if the user moves towards a substantially different location or is orientated in a substantially different direction. This is beneficial, because the mapping does not change constantly if the user moves.

The mapping may be performed only when the user has been located at a (current) location (or an area) in the space for a predetermined period of time. Hence, the mapping only occurs if the user stays at a certain location in the space for a minimum amount of time. This is beneficial, because the mapping does not change constantly. Additionally or alternatively, the mapping may be performed only when the user has been oriented in a same orientation for a predetermined period of time. This is beneficial, because the mapping does not change constantly.

The light settings may be based on media content (e.g. video, a video game, audio, etc.). The light settings based on the media content may be mapped onto the lighting units based on the light settings' respective circadian rhythm values and based on the lighting units' respective locations relative to the location and/or orientation of the user. This is beneficial, because when the media content is being rendered, the lighting may be controlled in accordance with the user's circadian rhythm.

The light settings may be based on colors of one or more images. The colors may be extracted from the one or more images or be associated with the one or more images. The light settings based on the colors of the one or more images may be mapped onto the lighting units based on the light settings' respective circadian rhythm values and based on the lighting units' respective locations relative to the location and/or orientation of the user.

The method may further comprise: receiving activity information indicative of a current activity of the user, and the mapping may be further based on the current activity of the user. Taking the activity into consideration when determining the mapping is beneficial because it may have a positive effect on performing the activity.

The method may further comprise: receiving activity information indicative of an upcoming activity of the user, and the mapping may be further based on the upcoming activity of the user. The upcoming activity may be predefined and the activity information may for example be obtained from a user schedule or a calendar, the upcoming activity may be determined based on historical activities of the user, etc. It may be beneficial if the upcoming activity is known, and to map the light settings accordingly, because it may prepare the user for the upcoming activity.

The method may further comprise: obtaining light rendering properties of the plurality of lighting units, and the mapping may be further based on the light rendering properties of the plurality of lighting units. For instance, a colored light setting may be mapped onto a lighting unit configured to emit colored light and a white light setting may be mapped onto a lighting unit configured to emit white light.

According to a second aspect of the present invention, the object is achieved by a computer program product for a computing device, the computer program product comprising computer program code to perform any one of the above-mentioned methods when the computer program product is run on a processing unit of the computing device.

According to a third aspect of the present invention, the object is achieved by a controller for controlling a plurality of lighting units in a space, the controller comprising:
an input module configured to receive an input indicative of an activation of a light scene comprising a plurality of light settings for the plurality of lighting units,
a processor configured to obtain location information indicative of locations of the plurality of lighting units relative to a location and/or an orientation of a user in the space, obtain a circadian rhythm value for each light setting, wherein the circadian rhythm value is indicative of an impact of a respective light spectrum of a respective light setting on the circadian rhythm of a person, map the plurality of light settings onto the plurality of lighting units, wherein each light setting is mapped onto a lighting unit based on the light setting's respective circadian rhythm value and based on the lighting unit's respective location relative to the location and/or orientation of the user, and control the plurality of lighting units according to the mapped light settings.

According to a fourth aspect of the present invention, the object is achieved by a lighting system comprising:
the controller,
a plurality of lighting units, and
a communication unit configured to communicate lighting control commands to the plurality of lighting units.

It should be understood that the computer program product, the controller and the lighting system may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which:

FIG. 3a shows schematically an embodiment of a system comprising a plurality of lighting units in a space that may be controlled based on their location, their circadian rhythm value and based on a location of a user;

FIG. 3b shows schematically an embodiment of a system comprising a plurality of lighting units in a space that may be controlled based on their location, their circadian rhythm value and based on an orientation of a user.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
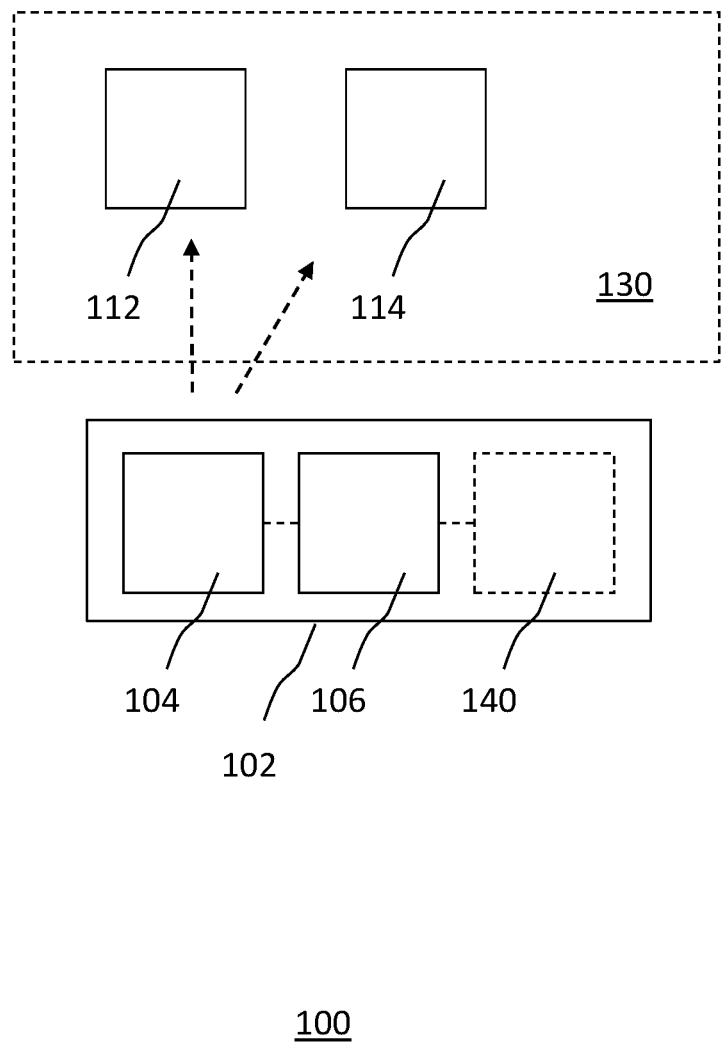
FIG. 1 shows schematically an embodiment of a system comprising a controller for controlling a plurality of lighting units in a space.

FIG. 1 shows schematically an embodiment of a system 100 comprising a controller 102 for controlling a plurality of lighting units 112, 114 in a space 130. The controller 102 comprises processor 106 configured to receive an input indicative of an activation of a light scene comprising a plurality of light settings for the plurality of lighting units 112, 114. The processor 106 (e.g. a microcontroller, circuitry, a microchip, etc.) is further configured to obtain location information indicative of locations of the plurality of lighting units 112, 114 relative to a location and/or an orientation of a user in the space 130. The processor 106 is further configured to obtain a circadian rhythm value for each light setting, wherein the circadian rhythm value is indicative of an impact of a respective light spectrum of a respective light setting on the circadian rhythm of a person. The processor 106 is further configured to map the plurality of light settings of the light scene onto the plurality of lighting units 112, 114, wherein each light setting is mapped onto a lighting unit based on the light setting's respective circadian rhythm value and based on the lighting unit's respective location relative to the location and/or orientation of the user, and to control the plurality of lighting units 112, 114 according to the mapped light settings. By mapping the light settings of the light scene onto the lighting units 112, 114, the light settings of the light scene are maintained.

The lighting units 112, 114 comprise one or more (LED) light sources. The lighting units 112, 114 may be light bulbs, light strips, TLEDs, light tiles, etc. The lighting units may be individually controllable light sources of a luminaire (e.g. an LED strip). The lighting units 112, 114 may comprise a control unit, such as a microcontroller (not shown), for controlling the light output generated by the one or more light sources based on received lighting control commands (which may be based on the generated light settings/light scene, which may be received from the controller 102). A lighting control command may comprise lighting control instructions for controlling the light output, such as the color, intensity, saturation, beam size, beam shape, etc. of the one or more light sources.

The controller 102 may be comprised in any type of lighting control device. The controller 102 may, for example, be comprised in a mobile device (e.g. a smartphone, a wearable device, a (tablet) pc, etc.), in a central lighting controller (e.g. a bridge, a router, a central home controller, a smart voice assistant, etc.), a remote server connected to the lighting units 112, 114 via a network/the internet, etc. The controller 102 may be configured to control the lighting units 112, 114. The controller 102 may comprise a communication unit 104 configured to communicate lighting control commands via any wired or wireless communication protocol (e.g. Ethernet, DALI, Bluetooth, Wi-Fi, Li-Fi, Thread, ZigBee, etc.) to the lighting units 112, 114, either directly or indirectly.

The communication unit 104 may be configured to obtain the location information and/or the circadian rhythm values of the light settings. Additionally or alternatively, the processor 106 may obtain the location information and/or the circadian rhythm values from a memory 140, which may be comprised in the controller 102.

The processor 106 is configured to receive the input indicative of an activation of a plurality of light settings for the plurality of lighting units 112, 114. The input may be a signal received from an external source (e.g. a smartphone, a sensor, a lighting control device, etc.), for example via the communication unit 104. A user may, for example, select a light scene (which may be indicative of the plurality of light settings for the plurality of lighting units 112, 114) via a user interface (e.g. by providing a voice command to activate the light scene, by selecting the light scene via a touch-sensitive display, by selecting the light scene via a light switch, etc.). Alternatively, the input may be a signal received from an internal source (e.g. a software application running on the processor 106). The input may, for example, be indicative of an activation of a lighting control routine, or a scheduled light scene, which may be activated based on the time of day.

The plurality of light settings may be based on media content (e.g. video, a video game, audio, etc.), and the processor 106 may be configured to receive the input indicative of the activation thereof. The processor 106 may be configured to obtain a light script (e.g. via the communication unit 104 from a remote source, or from the memory 140) for the media content and control the light output of the lighting units 112, 114 in accordance with the light script, such that changes in the light output are synchronized with changes in the media content. Alternatively, the processor 106 may be configured to receive a stream of light settings (e.g. via the communication unit 104) that correspond to the media content. The light settings may be determined based on the media content (e.g. extracted from one or more images of the media content and/or from audio) by the processor 106 or by the remote source. Techniques to control lighting units based on media content (e.g. real-time or lighting script-based) are known in the art and will therefore not be discussed in detail. The plurality of light settings may be based on colors of one or more images, and the input may be indicative of a selection of an image. The image may, for example, be selected by a user via a user interface of a mobile device such as a smartphone. The colors may be extracted from the one or more images or be associated with the one or more images. The colors may be extracted from the image by analyzing color values of pixels or groups of pixels of the image. The extracted colors may, for example, be dominant colors from the image. Techniques for extracting colors from images are known in the art and will therefore not be discussed in detail.

The processor 106 is further configured to obtain location information indicative of locations of the plurality of lighting units 112, 114 relative to the location and/or the orientation of the user in the space. The location information may, for example, comprise coordinates of the lighting units 112, 114 and the user relative to the space 130. The location information may, for example, comprise a map of the space 130, the map being indicative of locations of the lighting units 112, 114 and a (predefined or current) location and/or orientation of the user. The location information may, for example, comprise descriptions of the locations of the lighting units 112, 114 relative to the space 130 (e.g. NWSE directions). The location information may be obtained from an (indoor) positioning system (e.g. an RF-based indoor positioning system or a visible light communication (VLC) based positioning system), it may be based on the signal strength of signals transmitted between one or more lighting units and a portable user device (e.g. a smartphone), based on an orientation sensor in the portable user device, based on camera images of the space wherein the user and the lighting units are present, based on predetermined user and lighting unit positions (e.g. defined by a user via a user interface), etc. Such techniques of obtaining position and/or orientation information are known in the art and will therefore not be discussed in further detail.

The processor 106 is further configured to obtain a circadian rhythm value for each light setting of the plurality of light settings. The circadian rhythm value is indicative of an impact of a respective light spectrum of a respective light setting on the circadian rhythm of a person. The circadian rhythm value may be represented as a or a color value. The circadian rhythm values may be indicative of melatonin suppression levels the spectrum of the light settings. Melatonin is a hormone that regulates the sleep-wake cycle/the circadian rhythm of a person. The effects of different colors of light on the melatonin production of a person are known in the art and will therefore not be discussed in detail.

The circadian rhythm values may, for example, be predefined and associated with the respective light settings and obtained from an internal or external memory. Alternatively, the circadian rhythm values may for example be determined by analyzing light properties of the plurality of light settings. These light properties may relate to the color, intensity, saturation, beam size, beam shape, etc. of the light settings.

Figure 2:
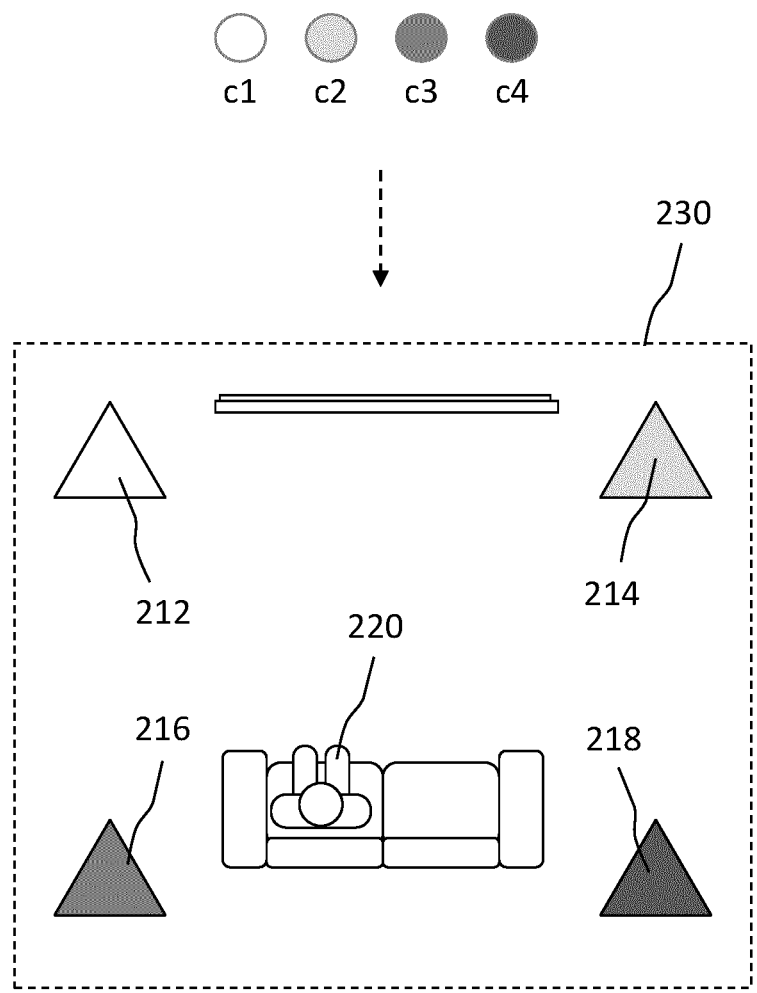
FIG. 2 shows schematically an embodiment of a system comprising a plurality of lighting units in a space that may be controlled based on their location and their circadian rhythm value.

The processor 106 is further configured to map the plurality of light settings onto the plurality of lighting units 112, 114, wherein each light setting is mapped onto a lighting unit based on the light setting's respective circadian rhythm value and based on the lighting unit's respective location relative to the location and/or orientation of the user. FIG. 2 illustrates an example of a mapping. The processor 106 may receive a plurality of light settings c1, c2, c3, c4 that are to be mapped onto a plurality of lighting units 212, 214, 216, 218. The processor 106 may further receive location information indicative of the locations of the plurality of lighting units 212, 214, 216, 218 relative to a location and/or an orientation of a user 220 in the space 230. The user location may be a predefined location relative to the space 230. In this example, the predefined location may be the position of the couch in FIG. 2. The processor 106 may further receive circadian rhythm values for the light settings c1, c2, c3, c4. In this example, the light settings may range from cool white (c1) to warm white (c4). The CCT values of the light settings may represent the circadian rhythm values. The processor 106 may determine the mapping of the plurality of light settings c1, c2, c3, c4 onto the plurality of lighting units 212, 214, 216, 218 based on their location and their circadian rhythm values, resulting in that the cool white light settings may be mapped in front of the user (i.e. on lighting units 212 and 214), and resulting in that the warm white light settings may be mapped in front of the user (i.e. on lighting units 216 and 218). As a result, the user 220 is exposed to more cool white light compared to warm white light.

In another example, the lighting units 112, 114 may be (groups of) light sources of an LED array, such as an LED strip or LED array. The light sources may be individually addressable/controllable, and the processor 106 may be configured to map the light settings onto the light sources based on the light sources' respective locations relative to the location and/or orientation of the user. Additionally, the processor 106 may, for example, control the LED array such that a gradient is created along the LED array, wherein a first light setting is mapped onto a first light source of the LED array in closest proximity to the user, and a second light setting is mapped onto a further light source of the LED array more distant from the user, and intermediary light settings are determined for intermediary light sources between the first and the further light source by interpolating between the first light setting and the second light setting.

The processor 106 may be further configured to determine the mapping based on a current time of day. The processor 106 may obtain the time from an (internal or external) clock. Referring to the example of FIG. 2, the processor 106 may map the light settings c1-c4 onto lighting units 212-218 based on the locations of the lighting units, based on the circadian rhythm values and based on the current time of day. The processor 106 may, for example, map (cool white) light settings c1 and c2 onto lighting units 212 and 214 and (warm white) light settings c3 and c4 onto lighting units 216 and 218 in the morning (e.g. between 08:00-11:00 AM), and map (cool white) light settings c1 and c2 onto lighting units 216 and 218 and (warm white) light settings c3 and c4 onto lighting units 212 and 214 in the evening (e.g. between 18:00-23:00 PM). As a result, the user 220 is exposed to more cool white light compared to warm white light in the morning, and to more warm white light compared to cool white light in the evening.

The processor 106 may be further configured to determine the mapping based on a circadian rhythm of the user. Information about the circadian rhythm of the user may be obtained by the processor from, for example, a memory, a user profile, etc. Consequently, the light settings may be mapped onto the lighting units such that they are suitable for the circadian rhythm of the specific user in the space, thereby improving the user's comfort. The circadian rhythm of the user may correspond to the circadian rhythm at the space (e.g. at that geographical location), or the circadian rhythm of the user may differ from the circadian rhythm at the space, for example because the user is travelling and the user desires a different rhythm (of a different geographical location).

The processor 106 may be further configured to determine the locations of light effects (created by respective lighting units 112, 114) relative to the location of the user. The processor may, for example, obtain light property information about the light properties of the lighting units 112, 114. This information may, for example, be received via the communication unit 104 from the lighting units 112, 114 or from a central lighting control system, or the information may be obtained from an (internal or external) memory 140. The light properties may relate to the color, intensity, saturation, beam size, beam shape, etc. of the light effect that can be created by a respective lighting unit if a respective light setting would be mapped onto that light unit. If the light properties and the location (and, optionally, the orientation) of a lighting unit are known, the location of the light effect can be estimated/determined.

The processor 106 may be further configured to determine the mapping based on the locations of the plurality of lighting units and/or (the locations of) their light effects relative to a field of view of the user. The field of view of the user may be determined based on the location and the orientation of the user, and the field of view may be defined by a predefined/user-defined view angle. Alternatively, the field of view may be determined based on data indicative of which lighting units are visible from the position of the user. A user may, for example, wear/carry a (head-mounted) device comprising a camera or light sensor, and the lighting units may be configured to emit an identifiable code. When a code of a lighting unit is detected by the camera or light sensor, this may indicate that that lighting unit is the field of view of the user.

The processor 106 may be further configured to determine the mapping based on respective distances between the user and the plurality of lighting units 112, 114 and/or their light effects. If, for example, a first lighting unit 112 is in closer proximity to the user compared to a second lighting unit 114, a first light setting (e.g. a blue light setting) may be mapped onto the first lighting unit 112 based the lighting unit's distance to the user and based on the first light setting's circadian rhythm value (blue light may have a melatonin suppressing effect on the user). A second light setting (e.g. a red light setting) may be mapped onto the second lighting unit 114 based on the second lighting unit's distance to the user and the second light setting's circadian rhythm value (red light may have a positive effect on melatonin production).

In the above-mentioned example referring to FIG. 2, the location (and/or the orientation) of the user 220 may be predefined. Alternatively, the location and/or the orientation may be based on a detection of a current location and/or the orientation of the user 130. In the example of FIG. 3a the location of the user 330 in the space 330 may be detected. The processor 106 may determine the mapping based on the user location, the locations of the lighting units 312, 314, 316, 318 and the circadian rhythm values of light settings $c_1$, $c_2$, $c_3$, $c_4$, and control the lighting units 312, 314, 316, 318 accordingly. For some use cases, detecting the orientation may not be required, for instance if the orientation is predetermined (e.g. in a certain type of room such as a living room the orientation may typically be the same for multiple locations). In the example of FIG. 3b, the orientation of the user in the space 330 may be detected. The processor 106 may determine the mapping based on the user orientation, the locations of the lighting units 312, 314, 316, 318 and the circadian rhythm values of light settings $c_1$, $c_2$, $c_3$, $c_4$, and control the lighting units 312, 314, 316, 318 accordingly.

The processor 106 may be configured to repeatedly detect the current location and/or orientation of the user, and to remap the plurality of light settings onto the plurality of lighting units 112, 114 if a difference between a new location and/or orientation of the user and a previous location and/or orientation of the user exceeds a threshold. The processor 106 may change the mapping only if the user moves towards a substantially different location or is orientated in a substantially different direction.

The processor 106 may be configured to map (or remap) the light settings onto the lighting units 112, 114 only when the user has been located at a (current) location (or an area) in the space 130 for a predetermined period of time (e.g. 30 seconds, 1 minute). The processor 106 may map (or remap) the light settings onto the lighting units 112, 114 only if the user stays at a certain location in the space 130 for a minimum amount of time. Additionally or alternatively, the processor 106 may be configured to map (or remap) the light settings onto the lighting units 112, 114 only when the user has been oriented in a same orientation for a predetermined period of time (e.g. 30 seconds, 1 minute).

The processor 106 may be further configured to obtain activity information indicative of a current activity of the user, and to determine the mapping further based on the current activity of the user. The activity information may be received via the communication unit 104 from an external source (e.g. a central (home) control system, an activity detection system, etc.), or the activity information may for example be obtained from the memory 140 (e.g. from a user schedule, a calendar, etc.). If, for example, a user is working, light settings of which the light would suppress the melatonin production of the user may be mapped onto lighting units in close proximity and/or in the field of view of the user, whereas if a user is relaxing, light settings of which the light would stimulate melatonin production of the user may be mapped onto lighting units in close proximity and/or in the field of view of the user.

The processor 106 may be further configured to obtain activity information indicative of an upcoming activity of the user, and to determine the mapping further based on the upcoming activity of the user. The upcoming activity may be predefined and the activity information may for example be obtained from a memory 140 storing a user schedule or a calendar. The upcoming activity may have been determined/learnt based on detected historical activities of the user. If, for example, the activity information is indicative of that the user will go to bed, the light settings of which the light would stimulate the melatonin production of the user may be mapped onto lighting units in close proximity and/or in the field of view of the user, whereas if the information is indicative of that the user will study, light settings of which the light would suppress the melatonin production of the user may be mapped onto lighting units in close proximity and/or in the field of view of the user.

The processor 106 may be further configured to obtain light rendering properties of the plurality of lighting units, and the mapping may be further based on the light rendering properties of the plurality of lighting units. For instance, a colored light setting may be mapped onto a lighting unit configured to emit colored light and a white light setting may be mapped onto a lighting unit configured to emit white light.

Figure 4:
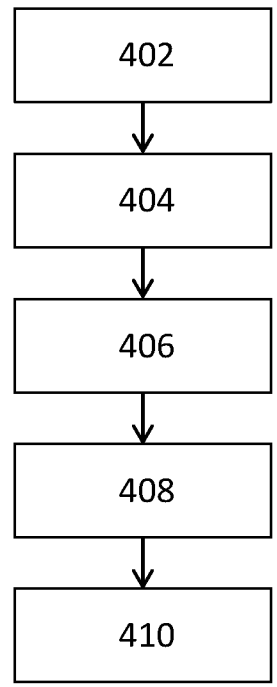
FIG. 4 shows schematically a method of controlling a plurality of lighting units in a space.

FIG. 4 shows schematically a method 400 of controlling a plurality of lighting units in a space. The method 400 comprises:
- receiving 402 an input indicative of an activation of a plurality of light settings for the plurality of lighting units,
- obtaining 404 location information indicative of locations of the plurality of lighting units relative to a location and/or an orientation of a user in the space,
- obtaining 406 a circadian rhythm value for each light setting, wherein the circadian rhythm value is indicative of an impact of a respective light spectrum of a respective light setting on the circadian rhythm of a person,
- mapping 408 the plurality of light settings onto the plurality of lighting units, wherein each light setting is mapped onto a lighting unit based on the light setting's respective circadian rhythm value and based on the lighting unit's respective location relative to the location and/or orientation of the user, and
- controlling 410 the plurality of lighting units according to the mapped light settings.

The method 400 may be executed by computer program code of a computer program product when the computer program product is run on a processing unit of a computing device, such as the processor 106 of the controller 102.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of controlling a plurality of lighting units in a space, the method comprising:
   - receiving an input indicative of an activation of a light scene comprising a plurality of light settings for the plurality of lighting units,
   - obtaining location information indicative of locations of the plurality of lighting units relative to a location and/or an orientation of a user in the space, the location and/or the orientation of the user being obtained by detecting a current location and/or orientation of the user,
   - obtaining a circadian rhythm value for each light setting, wherein the circadian rhythm value is indicative of an impact of a respective light spectrum of a respective light setting on the circadian rhythm of a person,
   - mapping the plurality of light settings onto the plurality of lighting units, wherein each light setting is mapped onto a lighting unit based on the light setting's respective circadian rhythm value and based on the lighting unit's respective location relative to the location and/or orientation of the user,
   - controlling the plurality of lighting units according to the mapped light settings,
   - repeatedly detecting the current location and/or orientation of the user, and
   - remapping the plurality of light settings onto the plurality of lighting units if a difference between a new location and/or orientation of the user and a previous location and/or orientation of the user exceeds a threshold.

2. The method of claim 1, wherein the mapping is further based on a current time of day and/or the circadian rhythm of the user.

3. The method of claim 1, wherein the mapping is further based on the locations of the plurality of lighting units and/or their light effects relative to a field of view of the user.

4. The method of claim 1, wherein the mapping is further based on respective distances between the user and the plurality of lighting units and/or their light effects.

5. The method of claim 1, wherein the location and/or the orientation of the user are predefined.

6. The method of claim 1, wherein the light settings are based on media content.

7. The method of claim 1, wherein the light settings are based on colors of one or more images.

8. The method of claim 1, further comprising:
   - receiving activity information indicative of a current activity of the user, wherein the mapping is further based on the current activity of the user.

9. The method of claim 1, further comprising:
   - receiving activity information indicative of an upcoming activity of the user, wherein the mapping is further based on the upcoming activity of the user.

10. The method of claim 1, further comprising:
obtaining light rendering properties of the plurality of lighting units, wherein the mapping is further based on the light rendering properties of the plurality of lighting units.

11. A non-transitory computer program comprising instructions that cause a computing device to perform the method of claim 1 when the computer program is executed on the computing device.

12. A controller for controlling a plurality of lighting units in a space, the controller comprising:
a processor configured to:
receive an input indicative of an activation of a light scene comprising a plurality of light settings for the plurality of lighting units,
obtain location information indicative of locations of the plurality of lighting units relative to a location and/or an orientation of a user in the space, the location and/or the orientation of the user being obtained by detecting a current location and/or orientation of the user,
obtain a circadian rhythm value for each light setting, wherein the circadian rhythm value is indicative of an impact of a respective light spectrum of a respective light setting on the circadian rhythm of a person,
map the plurality of light settings onto the plurality of lighting units, wherein each light setting is mapped onto a lighting unit based on the light setting's respective circadian rhythm value and based on the lighting unit's respective location relative to the location and/or orientation of the user,
control the plurality of lighting units according to the mapped light settings,
repeatedly detect the current location and/or orientation of the user, and
remap the plurality of light settings onto the plurality of lighting units if a difference between a new location and/or orientation of the user and a previous location and/or orientation of the user exceeds a threshold.

13. A lighting system comprising:
the controller of claim 12,
a plurality of lighting units, and
a communication unit configured to communicate lighting control commands to the plurality of lighting units.

* * * * *